June 16, 1953  H. Z. MARTIN  2,642,340
PRODUCTION OF OXYGEN
Filed May 10, 1946  2 Sheets-Sheet 1
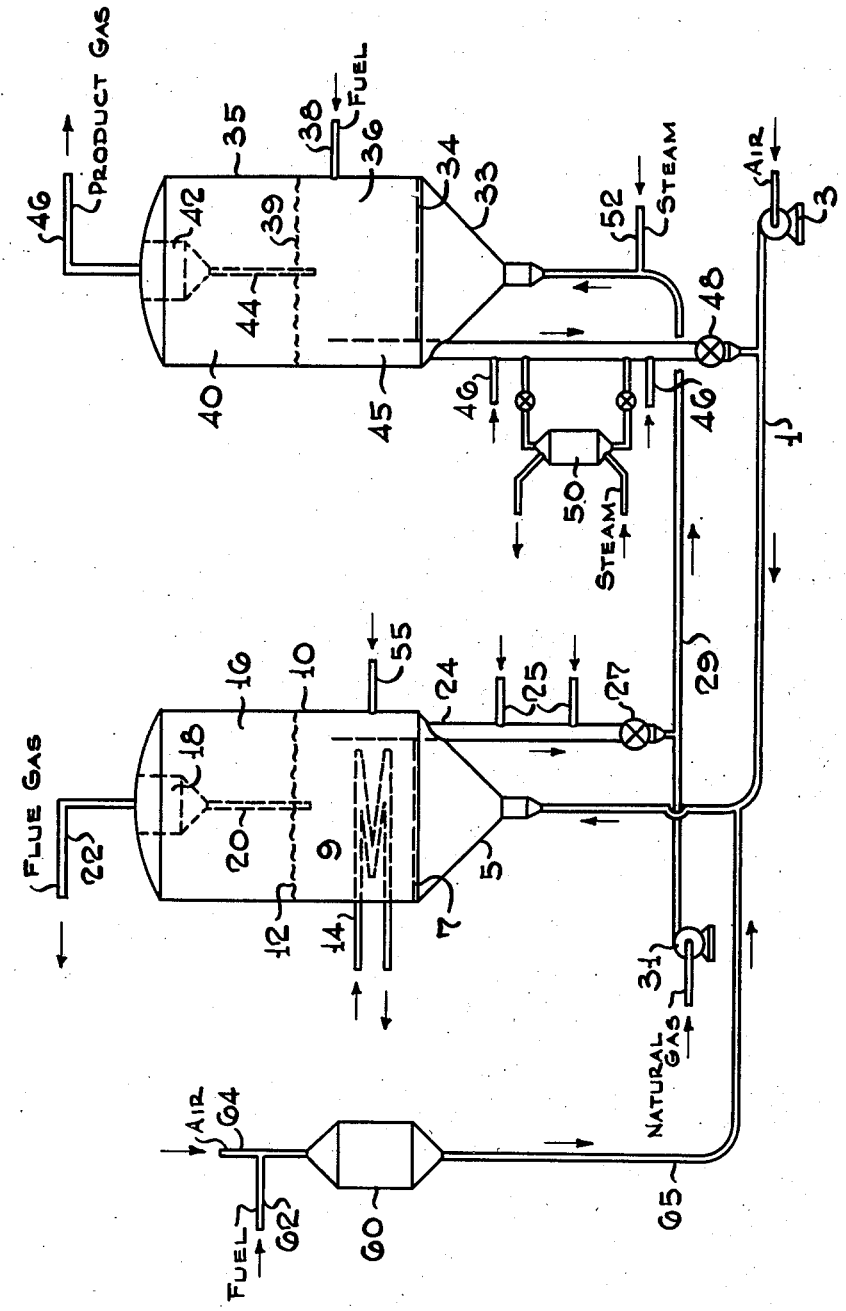
Homer Z. Martin Inventor
By P. J. Whelan Attorney

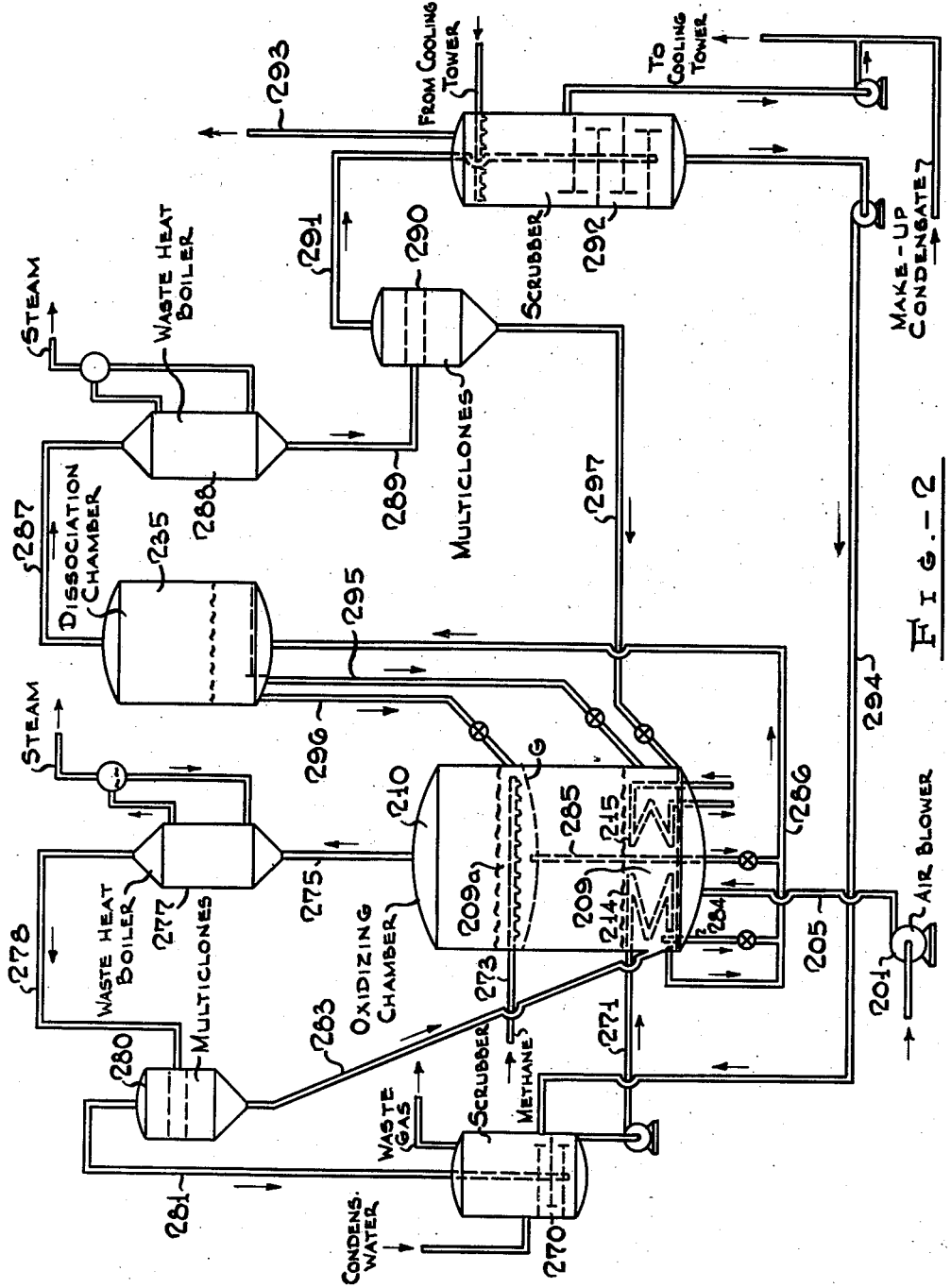

Patented June 16, 1953

2,642,340

UNITED STATES PATENT OFFICE 2,642,340

PRODUCTION OF OXYGEN

Homer Z. Martin, Roselle, N. J., assignor to Standard Oil Development Company, a corporation of Delaware Application May 10, 1946, Serial No. 668,672

5 Claims. (Cl. 23—221)

The present invention refers to the production of oxidizing gases. More particularly, the invention is concerned with the production of oxygen by a process involving the dissociation of oxidized oxygen acceptors such as metal oxides, and a specific embodiment of the invention is concerned with the production of oxygen and carbon oxides by a process of this type.

Heretofore, practically the whole of the oxygen of commerce has been manufactured by the liquefaction and fractionation of air. This process requires the compression of air to high pressures involving expensive equipment as well as high operating and maintenance cost. As a result, the production of oxygen from liquid air is uneconomical for many uses of oxygen, particularly where large amounts of low-cost oxygen are needed. Numerous attempts have been made to extract oxygen from air by other more economical methods. The most prominent of the methods used for this purpose involves the oxidation of a fixed bed of readily oxidizable metals or metal oxides by a stream of air followed by thermal dissociation of the metal oxide formed, in accordance with various chemical reactions such as:

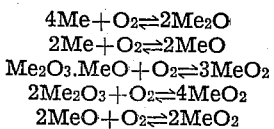

Various metals and metal oxides such as lead, silver, manganese sesquioxide, barium oxide, etc. are theoretically suitable for this type of reaction. However, large scale commercial application has encountered serious difficulties mainly due to the fact that these reactions require close temperature control and a large reaction surface for the efficient fixation and liberation of the oxygen of the air. During the heat-generating oxidation stage the temperature must be kept below the dissociation temperature of the oxide to be formed and the reacting solid must be finely divided in order to bind the oxygen of the air in an efficient manner. During the dissociation stage the oxide particles should preferably be completely and rapidly heated to dissociation temperature in order to recover oxygen in economical yields. In view of the low heat conductivity of the metal oxides involved and the extremely high pressure drop over fixed bed columns of finely divided solids of considerable length this arrangement does not lend itself to commercial application and has failed to achieve practical importance.

The present invention overcomes the aforementioned difficulties and affords various additional advantages as will be fully understood from the following detailed description. The invention is illustrated by a drawing which shows diagrammatically the arrangement of apparatus for carrying out the process.

It is the principal object of my invention to provide an improved process for producing oxygen from air.

Another object of my invention is to provide an improved process for extracting oxygen from air by reacting solid oxygen acceptors with air to form oxygen compounds dissociable by heat and liberating oxygen by subjecting the oxygen compounds to dissociation conditions.

A further object of my invention is to provide an improved process for the production of gases rich in oxygen and/or carbon oxides by extracting oxygen from air and reacting the oxygen with carbonaceous fuels.

A more specific object of my invention is to provide a process of the type specified which affords improved temperature control, heat economy and gas flow characteristics.

Other and further objects will become apparent from the following disclosure and claims.

I have found that oxygen may be produced from air in a highly efficient manner which is economically operative on the largest commercial scale when air is reacted with a dense turbulent bed of a finely divided solid oxygen acceptor maintained in a fluidized state by the upwardly streaming air and the solid oxygen compound formed is thereupon heated in the form of a similar fluidized bed of finely divided solids to temperatures suitable to cause dissociation and liberation of the oxygen transferred from the air to the oxygen acceptor.

The heat required for the dissociation reaction is supplied by conducting a heat-liberating reaction in direct contact with the oxygen acceptor, for example heat may be supplied by the combustion of a properly distributed fuel introduced into the fluidized bed of finely divided oxide. Fluidization of the solids during the dissociation reaction is accomplished by the liberated oxygen if desired in combination with a suitable fluidizing gas such as steam or natural gas. The feed rate of these gases may also be so controlled that they aid materially in removing the liberated oxygen from the dissociation zone and thus in reducing the oxygen partial pressure whereby the dissociation is materially enhanced. The dense turbulent fluidized beds of finely divided solids resemble a boiling liquid in appearance as well as with respect to heat transfer, heat distribution and hydrostatic and hydrodynamic characteristics. As a result, the oxidation temperature may be readily maintained at the desired level throughout the reacting bed of solids by withdrawing heat from any point or zone of the pseudo-liquid bed with the aid of simple conventional heat transfer equipment. The heat of dissociation may be produced within the fluidized mass of solid oxygen compound in the most efficient manner and transferred instantly to the individual solid particles. The solid reactants present the largest possible reaction surface without obstructing the flow of the reacting and product gases.

A further advantage of my invention resides in the fact that my fluidized solids may be as conveniently and easily handled and conveyed as a true liquid. I prefer, therefore, to maintain a continuous flow of fluidized finely divided solids between an oxidation zone and a dissociation zone utilizing the pseudo-hydrostatic pressure of relatively high columns of fluidized solids to effect the desired circulation.

Oxygen acceptors suitable for my process include various metals such as silver, which may be oxidized with air to form solid oxides decomposable by heat, or various oxides of metals having more than one valency, such as manganese oxides, barium oxides, chromium oxides, etc. which may be oxidized with air to higher states of oxidation which on their part give off oxygen to form the initial lower oxides when exposed to suitable temperatures. The particle size of the solid oxygen acceptor may vary within the approximate limits of 50–400 mesh depending on the specific gravity though it is desirable that the granules be not larger than about 100 mesh and that not more than about 25% of the solids consist of material finer than 325 mesh. In general it is preferred to use materials within the range of 200–400 mesh or finer. When using particles of such dimensions the velocity of the gases fluidizing the mass should be about 0.3–5 ft. per second to form a turbulent dense fluidized bed of solids having a well defined upper level.

The fuel introduced into the oxidation and/or dissociation zone to supply the heat required for the dissociation reaction and to compensate for the heat loss from the entire system may be a fuel gas such as hydrogen, methane, natural gas or the like, a liquid fuel such as gas oil or fuel oil or a finely divided solid fuel such as coal, coke, wood, etc. of fluidizable particle size. When solid fuels are used it may be desirable to start up the process using a fuel gas or oil until a temperature between about 500 and 1000° F. is attained at which a solid fuel will readily burn in the presence of the liberated oxygen. It will be necessary, however, to remove ashes left by the solid fuel from the circulating oxygen-transfer solids, which may be accomplished by liquid or gas phase elutriation.

In general the process of my invention may produce a mixture of oxygen, water vapor and carbon oxides in proportions depending on the amount of dissociable oxygen available in the oxidized compound, the temperature of the dissociation zone and the quantity and quality of the fuel used. Operative dissociation temperatures vary within wide limits depending on the oxygen acceptor used and lie mostly about 100–400° F. above the optimum oxidation temperatures which may be of the order of 400–1100° F. or higher. The fuel requirement may vary between about 30 and 1000 B. t. u. per cu. ft. of oxygen produced depending on the character of the oxygen acceptor used.

For many purposes the gas mixture produced may be treated in a conventional manner to remove entrained solids, water vapor and $CO_2$ by a combination of gas-solids separation, cooling and scrubbing to produce technically pure oxygen.

For other uses, as for example, for the oxidation of methane to produce mixtures of CO and $H_2$ suitable for the catalytic synthesis of hydrocarbons it may be desirable to leave the $CO_2$ in the product gas and to remove only the water vapor. In this manner, $CO_2$ is reacted with methane in the subsequent operation and the proportion of CO in the synthesis gas is increased. If a synthesis gas rich in hydrogen is desired the water vapor may likewise be left in the product gas. Hertofore, the so-called tail gas from the hydrocarbon synthesis itself, containing considerable proportions of $CO_2$ aside from unreacted feed gas components and uncondensable hydrocarbons, has been frequently recycled to the methane oxidation for the same purpose. It will be appreciated that the present invention eliminates the necessity of this expensive recycle procedure. If the hot product gas of my process is converted into synthesis gas by reacting all three components, oxygen, $CO_2$ and water, with methane the desired ratio of $CO_2$ to water in the oxygen-containing product gas may be attained by choosing a fuel or mixture of fuels having the proper ratio of hydrogen to carbon.

In accordance with a further embodiment of my invention heat of dissociation is supplied by causing steam to condense in the dissociation zone by adsorption of the steam on a solid adsorbent material such as silica gel, an acid-treated bentonitic clay of the montmorillonite type, or the like which may be admixed in a finely divided state with the fluidized oxygen acceptor. The condensation of the steam liberates at least a part of the heat required for the dissociation of the oxidized oxygen acceptor. The solid adsorbent is then circulated with the oxygen acceptor to the oxidizing zone in which the conditions of steam pressure and temperature are such as to permit evaporation of steam from the adsorbent solid. This evaporation absorbs at least a part of the heat liberated by the oxidation of the oxygen acceptor. The presence of steam in the dissociation zone has the additional advantage of lowering the oxygen partial pressure whereby the liberation of oxygen from the oxygen acceptor is enhanced and the dissociation temperature may be considerably reduced, if desired.

Sufficient fuel gas or other convenient fuel may be added to the solids mixture entering the oxidizing zone to supply additional heat by combustion with air to make up for heat losses from the system. Alternatively, a hot flue gas produced in an auxiliary combustion zone may be supplied to the oxidizing and/or dissociation zone for this purpose.

Having set forth the general nature and objects, the invention will be best understood from the more detailed description hereinafter, in which reference will be made to the accompanying drawing wherein Figure 1 shows a schematic view of an apparatus suitable for carrying out a preferred embodiment of my invention, and Figure 2 shows a similar view of apparatus adapted to carry out another embodiment of the invention.

Referring now in detail to Figure 1, the apparatus illustrated therein essentially comprises an oxidizing chamber 10 and a dissociation chamber 35. The operation of the equipment shown will be specifically described with reference to the production of oxygen from air by means of $Mn_2O_3$ in accordance with the reversible reaction $$2Mn_2O_3 + O_2 \rightleftharpoons 2MnO_2$$

although other oxygen acceptors may be used as outlined above.

Air, which for the purposes of starting up the process may be preheated to a temperature of above 400° F., is supplied through line 1 by blower 3 at substantially atmospheric pressure to the lower conical portion 5 of oxidation chamber 10 provided with a horizontal perforated distribution plate or grid 7. The air enters the oxidation zone 9 of chamber 10 through grid 7 and passes upwardly through a dense turbulent mass of finely divided $Mn_2O_3$ which is fluidized and vigorously agitated by the air streams to resemble a boiling liquid having a well defined upper level 12. To accomplish best fluidization and to provide sufficient contact for satisfactory oxidation the average particle size of the $Mn_2O_3$ should be about 100 to 325 mesh, and the superficial velocity of the air within zone 9 about 0.5 to 1.5 ft. per second. At these conditions the fluidized mass of solids in zone 9 assumes an apparent density of about 15 to 50 lbs. per cu. ft. or more. The oxygen of the air reacts with the $Mn_2O_3$ to form $MnO_2$ in an exothermic reaction. In order to prevent the temperature from rising above an optimum level of about 900° F. heat may be withdrawn by means of a conventional cooling coil 14 arranged within zone 9. In general cooling coil 14 should be so designed that about 50 to 80 B. t. u. may be withdrawn per cubit foot of oxygen to be produced.

Air of considerably reduced oxygen content which may amount to about 0 to 5% is withdrawn overhead from zone 9, passes through the low density zone 16 above level 12 wherein it loses most of the entrained $Mn_2O_3$ and enters gas-solids separator 18 to be freed of entrained solids fines which may be returned to zone 9 through line 20. Separator 18 may be of any conventional design such as an electric and/or centrifugal type system. Residual air, substantially free of solids, is withdrawn through line 22 to be vented or used for heat or nitrogen recovery or other purposes.

Fluidized solids enriched with oxygen to approach closely an average composition of $MnO_2$ are withdrawn downwardly from the dense phase of zone 9 through an overflow standpipe 24 at a rate of at least about 0.85 lb. of solids per cu. ft. of oxygen to be produced. The flow of solids through standpipe 24 is facilitated by the introduction of small amounts of an aerating gas such as air, residual air, natural gas, etc., through lines 25. The stream of fluidized $MnO_2$ passes substantially at the temperature of zone 9 through control valve 27 into line 29 where it is picked up by a combustible gas such as natural gas, supplied at atmospheric or slightly elevated pressure by blower or compressor 31, to form a suspension of lesser density which is passed under the pseudo-hydrostatic pressure of standpipe 24 to dissociation chamber 35 through its lower conical portion 33 and distribution grid 34. The finely divided $MnO_2$ forms above grid 34, as a result of the larger cross-section of chamber 35 and the reduced gas velocity, a dense solids phase 36 similar in appearance and characteristics to that in zone 9 of chamber 10. Proper fluidization is accomplished by the gas supplied through line 29 and/or by the oxygen liberated in zone 36 as will be forthwith explained.

The heat required to bring the $MnO_2$ in zone 36 to or above dissociation temperature is generated by the combustion of the gas supplied through line 29 in contact with the hot $MnO_2$. When the liberation of oxygen begins the gas supply may be gradually substituted by a stream of gas oil, fuel oil or finely divided coal or coke fed to zone 36 through line 38 until just sufficient gas is used as is required to accomplish a proper flow of solids through line 29 and proper fluidization in zone 36. At that point, the fuel gas supplied by blower or compressor 31 may be replaced by a readily condensible gas such as steam, the heat-generating combustion being fully supported by the fuel supplied through line 38. Best results are obtained at dissociation temperatures of about 1000 to 1100° F. which may be maintained by supplying about 200 to 250 B. t. u. in the form of fuel per cubic foot of oxygen to be produced. It will be understood, however, that a gaseous or liquid fuel such as hydrogen, methane, or fuel oil leaving no solid residue may be used to supply all the heat required by the process.

A gas mixture consisting of a major proportion of oxygen amounting to about 30 to 50%, depending on the fuel used, and corresponding proportions of $CO_2$, water, and whatever stripping or fluidizing gas is used, is withdrawn overhead from zone 36 and freed of entrained solids in zone 40 above level 39 and in conventional gas-solids separator 42 from which separated solids are returned through line 44 to zone 36. Product gas substantially free of solids is withdrawn through line 46 to be treated or used as indicated above.

Fluidized solids of an average composition approaching $Mn_2O_3$ are withdrawn downwardly from the dense phase 36 through an overflow standpipe 45 which is aerated through lines 46. The solids pass substantially at the temperature of zone 36 through control valve 48 into line 1 where they are picked up by fresh air to form a suspension of lesser density which is passed under the pressure of standpipe 45 to chamber 10 as outlined above. The solids are withdrawn from zone 36 substantially at the same rate at which solids are withdrawn from chamber 10 through standpipe 24 so that levels 12 and 39 are maintained constant in continuous operation. The rate of total solids circulation is so controlled that the individual particles remain in chambers 10 and 35 respectively, for a time sufficient to accomplish the desired degree of oxidation and dissociation, respectively. If it is desired to remove ashes formed by the combustion of liquid and/or solid fuel from the circulating stream of manganese oxides an elutriation zone 50 may be provided as indicated or at any other suitable point of the oxide cycle. A gas such as hot residual air from line 22 may be blown at a relatively high velocity through vessel 50 in countercurrent to the downwardly flowing solids to carry the relatively light ashes overhead from vessel 50.

The embodiment of my invention described above permits of various modifications. Standpipes 24 and 45 may be replaced by other conveying means known in the art of handling fluidized solids such as pressurized feed hoppers, screw conveyors, etc. It will be understood that the circulation of solids between chambers 10 and 35 may be fully continuous or periodic at any desired intervals. I may also carry out oxidation and dissociation alternately in the same chamber, thus avoiding the necessity of solids circulation between two chambers. In this case two or more chambers may be operated alternatingly as oxidation and dissociation chambers by changing the gas flow and temperature conditions accordingly so as to maintain continuous production of oxygen. I may also operate chamber 35 at any desired elevated pressure without affecting the pressure in oxidation chamber 10. Thus, if it is desired to obtain the product gas at a pressure of about 50–200 lbs. per sq. in., e. g., for the production of high pressure synthesis gas I may compress accordingly the gas supplied to chamber 35 without the necessity of compressing the many times larger volume of air supplied to chamber 10. This results in considerable savings of compression cost of the product gas.

When it is desired to control the heat balance by the condensation and evaporation of steam with the aid of solid adsorbents a finely divided dehydrated water adsorbent material such as an acid-treated bentonitic clay of the montmorillonite type may be added to the oxygen acceptor in dissociation chamber 35. Steam is supplied to chamber 35 through line 52 in amounts sufficient to establish a steam partial pressure high enough to cause hydration of the solid adsorbent and to generate heat required for the desired dissociation. The hydrated adsorbent is passed together with the spent oxygen acceptor through standpipe 45 and air supply line 1 to oxidizing chamber 10. As a result of the exothermic heat available and the presence of large proportions of nitrogen and other inert gases in chamber 10, the water tends to vaporize from the adsorbent material. This vaporization adsorbs at least a portion of the heat liberated by the exothermic oxidation reaction and prevents the temperature from rising above the level at which the oxygen acceptor may bind oxygen at the prevailing pressures. The hydrated water adsorbent then partakes in the cycle of the oxygen acceptor described above.

Heat to replace heat losses may be added to the system by introducing a fuel, preferably a fuel gas, either into dissociation chamber 35 or preferably through line 55 into the portion of standpipe 24 within chamber 10. This fuel is burned by oxygen associated with the oxygen acceptor to generate heat. In this manner, the heat which must be added to the system is supplied to that portion which most requires heat input and the conditions most favorable for the oxidation in chamber 10 remain practically unaffected. I may also burn a suitable solid, liquid or gaseous fuel in a separate combustion zone 60 to which fuel and air are supplied through lines 62 and 64, respectively, and from which hot flue gases are withdrawn through line 65 and passed via line 1 to chamber 10.

While the amounts of steam and solid water adsorbent required for the desired heat control may vary within wide limits depending on specific operating conditions, good results may be obtained by using about 0.1 to 0.5 lbs. of steam to be condensed, and about 10 to 20 lbs. of an acid-treated bentonitic clay of the montmorillonite type to be circulated per cu. ft. of oxygen to be produced. It will be understood that this method of heat generation may be combined to any desired extent with the method of burning fuels described before.

In Figure 2, I have shown a system in which the heat of oxidation is removed by means of a water coil located directly in the fluid bed of the oxidizing zone and heat is supplied to the dissociation zone in the form of sensible heat of solids heated by combustion of a fuel in the oxidizing chamber, as will be apparent from the description below.

Referring now in detail to Figure 2, atmospheric air is compressed to about 6.5 lbs. per sq. in. gage by air blower 201 and passed through line 205 to oxidizing chamber 210 containing the oxygen acceptor such as $Mn_2O_3$ in a lower fluidized solids bed 209. About 60% of the oxygen of the air is used to oxidize $Mn_2O_3$ to $MnO_2$. Heat is removed from bed 209 by boiling water in tubes 214 and 215 to which water may be supplied from flue gas scrubber 270 through line 271 or from any other source. The oxidation is carried out at about 900° F. and the gases containing a small amount of entrained solids pass upward through a dilute phase and through an internal grid G into an upper zone 209a of chamber 210, containing a second fluidized solids bed. In this bed the remaining oxygen of the air is used to burn a fuel gas or other suitable liquid or solid fuel supplied through line 273 and to heat the solids to about 1200° F. The flue gases pass overhead through line 275, waste heat boiler 277, line 278, conventional gas-solids separation system 280, and line 281 into flue gas scrubber 270 for the recovery of the last traces of manganese oxides. Solids separated in 280 may be returned through line 283 to zone 209 of chamber 210.

Fluidized solids are removed from both zones 209 and 209a through standpipes 284 and 285, respectively, and are blown with steam from coil 214 through line 286 up into dissociation chamber 235. The steam, which also carries some solids scrubbed out in scrubber 270 serves to lower the partial pressure of the oxygen in chamber 235 and thus to enhance the decomposition of the oxide. Heat required for this purpose is supplied by the hot solids from zone 209a, so that the temperature in dissociation chamber 235 may be kept at about 1075° F.

Oxygen and steam pass overhead from chamber 235 through line 287 into a waste heat boiler 288 and through line 289, gas-solids separator 290 and line 291 to a scrubber 292 from which oxygen containing a small amount of steam is recovered through line 293 at about 120° F. and 1 atm. abs. pressure. Scrubbing water containing solids fines is returned from scrubbing tower 292 through line 294 to scrubbing tower 270.

The solids from dissociation chamber 235 are passed through pipes 295 and 296, to zones 209 and 209a respectively, in the approximate weight ratio of 1 to 10. Solids separated in separator 290 may be returned to zone 209 through line 297.

It will be understood that this process produces considerable amounts of useful steam in addition to oxygen and low pressure steam used in the dissociation chamber. This is accomplished by means of cooling coil 214 fed with a water slurry withdrawn from scrubbers 270 and 292. The steam is produced at a sufficient pressure to permit its use in chamber 235, the drying of the solids suspended in the water and their return to chamber 210.

The oxygen may be kept pure by stripping the solids streams leaving zones 209 and 209a with steam. The solids streams leaving chamber 235 may likewise be steam stripped to avoid loss of oxygen from chamber 235 to chamber 210.

For the production of about 80 million cu. ft. of oxygen per day with the aid of $Mn_2O_3$ a plant of the type illustrated in Figure 2 may be operated about as follows:

| | | |
|---|---|---|
| Air supply | mols/hr | 71,550 |
| Temperature in 209 | | 900° F. |
| Temperature in 209a | | 1200° F. |
| Temperature in 235 | | 1075° F. |
| Condensate water to scrubber 270 | lbs./hr | 212,000 |
| Water to coil 214 | gal./min | 360 |
| Make up condensate water to scrubber 292 | lbs./hr | 242,000 |
| Water from scrubber 292 to scrubber 270 | gal./min | 360 |
| Steam to chamber 235 | lbs./hr | 179,000 |
| Solids in steam line 286 | tons/min | 240 |
| Solids in pipe 295 | do | 23 |
| Solids in pipe 296 | do | 215 |
| Solids in pipe 283 | tons/hr | 140 |
| Solids in pipe 297 | do | 35.5 |
| $CH_4$ supply to 209a | mols/hr | 2,840 |
| 150 p. s. i. g. steam recovered from 215, 277 and 288 | lbs./hr | 439,000 |

It is noted that the modifications described in connection with the system of Figure 1 may be similarly applied to the system of Figure 2. In particular I may apply heat control by means of steam adsorption and desorption with the aid of solid water adsorbents. In this case, it may not be necessary to maintain a bed of solids at an elevated temperature in a zone 209a to supply the heat requirements in chamber 235. Furthermore the net fuel requirement may thus be considerably reduced. If only one bed is used in the oxidizing chamber 210 the air may be compressed to a lower pressure since the pressure drop through the system is reduced. It will be readily understood by those skilled in the art that the fuel and steam demand of the system of Figure 2 may be easily adjusted in this manner to meet the requirements of any process to which the oxygen produced is to be applied.

While the foregoing description and exemplary operations have served to illustrate specific applications and results of my invention, other modifications obvious to those skilled in the art are within the scope of my invention. Only such limitations should be imposed on my invention as are indicated in the appended claims.

I claim:

1. A process for producing oxygen from air which comprises contacting in an oxidation zone said air with a solid oxygen acceptor selected from the group consisting of metals and metal oxides readily oxidizable by air to form a solid oxygen compound giving off oxygen when heated, maintaining said oxygen acceptor in the form of a dense turbulent fluidized bed having a well defined upper dense phase level by causing air to flow upwardly through said bed at a fluidizing velocity, withdrawing gasiform material containing free oxygen from said bed and causing said gasiform material to flow through a second fluidized bed of said oxygen acceptor at a fluidizing velocity, charging a fuel to said second named fluidized bed of said oxygen acceptor thereby causing combustion of said fuel by means of the oxygen present in the said gasiform material fed thereto, thus adding heat to said second fluidized bed of solids, withdrawing oxidized oxygen acceptor from both of said fluidized beds, conducting the withdrawn oxidized oxygen acceptor to a third fluidized bed disposed in a dissociation zone, causing steam to flow through said last named bed at a flow rate sufficient to maintain the latter in a fluidized condition and to lower the partial pressure of oxygen whereby oxygen is released from said oxygen acceptor, and recovering oxygen from said last named zone.

2. The process set forth in claim 1 in which a solid finely divided water adsorbent material is added to the said oxygen acceptor in the said third zone for the purpose of causing heat liberation in said zone by the absorption of the steam on the said finely divided adsorbent material.

3. The method set forth in claim 1 in which the dissociation zone is maintained at a substantially higher pressure than that prevailing in said oxidation zone.

4. The method set forth in claim 1 in which the said fuel added to said second named fluidized bed comprises a liquid fuel.

5. The method set forth in claim 1 in which the fuel added to said second named fluidized bed is a solid fuel of fluidizable size.

HOMER Z. MARTIN.

References Cited in the file of this patent

UNITED STATES PATENTS

| Number | Name | Date |
|---|---|---|
| 70,705 | Du Motay et al. | Nov. 12, 1867 |
| 874,596 | Janet | Dec. 24, 1907 |
| 945,048 | Ridley | Jan. 4, 1910 |
| 1,048,812 | Doherty | Dec. 31, 1912 |
| 1,984,380 | Odell | Dec. 18, 1934 |
| 2,362,270 | Hemminger | Nov. 7, 1944 |
| 2,396,709 | Leffer | Mar. 19, 1946 |
| 2,405,395 | Bahlke et al. | Aug. 6, 1946 |
| 2,418,402 | Gorin | Apr. 1, 1947 |
| 2,456,072 | Marisic | Dec. 14, 1948 |
| 2,473,129 | Atwell | June 14, 1949 |